United States Patent
Crowley, Jr.

(10) Patent No.: US 10,737,711 B2
(45) Date of Patent: Aug. 11, 2020

(54) MOBILE STORAGE CONTAINER FOR TRAVERSING WALLED PATHWAYS

(71) Applicant: Wallace J Crowley, Jr., Lebanon, NJ (US)

(72) Inventor: Wallace J Crowley, Jr., Lebanon, NJ (US)

( * ) Notice: Subject to any disclaimer, the term of this patent is extended or adjusted under 35 U.S.C. 154(b) by 563 days.

(21) Appl. No.: 15/530,353

(22) Filed: Jan. 3, 2017

(65) Prior Publication Data

US 2018/0186567 A1 Jul. 5, 2018

(51) Int. Cl.
*B62B 3/00* (2006.01)
*B62B 5/00* (2006.01)

(52) U.S. Cl.
CPC .............. *B62B 3/00* (2013.01); *B62B 5/0006* (2013.01); *B62B 3/002* (2013.01)

(58) Field of Classification Search
CPC ..... B62B 2301/02; B62B 3/1492; B62B 3/00; B62B 3/16; B62B 5/0006; B62B 3/002
See application file for complete search history.

(56) References Cited

U.S. PATENT DOCUMENTS

| | | | | |
|---|---|---|---|---|
| 3,495,553 A | * | 2/1970 | McClure | D06F 95/002 280/79.11 |
| 4,203,368 A | | 5/1980 | Haskins | |
| 4,347,791 A | | 9/1982 | Mandros | |
| 4,372,451 A | | 2/1983 | Rasmussen | |
| 5,605,344 A | * | 2/1997 | Insalaco | A47B 47/02 280/47.34 |
| 6,170,403 B1 | * | 1/2001 | Behringer | A63G 3/00 104/139 |
| 6,439,585 B1 | * | 8/2002 | Tan | B62B 1/266 280/47.26 |
| 7,201,385 B2 | * | 4/2007 | Renz | B62B 3/02 280/47.34 |
| 7,980,181 B2 | | 7/2011 | Heaslip et al. | |
| 8,375,864 B1 | * | 2/2013 | Crawford | A63G 21/18 104/53 |
| 8,893,623 B2 | | 11/2014 | Gordon | |
| 10,093,335 B2 | * | 10/2018 | Thuma | B62B 5/0006 |
| 2005/0038575 A1 | | 2/2005 | Wu | |
| 2006/0049729 A1 | * | 3/2006 | Mussche | B62B 3/003 312/319.6 |
| 2009/0189362 A1 | * | 7/2009 | DeWitt | B62B 3/008 280/47.26 |
| 2014/0015223 A1 | | 1/2014 | Banwart | |
| 2016/0137215 A1 | * | 5/2016 | Ondrasik | B62B 3/16 280/33.992 |

\* cited by examiner

*Primary Examiner* — Scott A Browne

(57) ABSTRACT

A movable storage container for traversing walled pathways, includes: a) a bin having a bottom and sidewalls and an open top, with an imaginary midline that defines a center with a forward section in front of the midline and an aft section behind the midline; b) at least four ground wheels connected to the bin structure adjacent the bin structure bottom for movement along any surface below the bottom of the bin structure, at least two ground wheels being in the forward section and at least two ground wheels being in the aft section; and c) at least four bumper wheels connected to the bin structure for movement along any surface aside the sidewalls, at least two bumper wheels being in the forward section and at least two bumper wheels being in the aft section.

9 Claims, 18 Drawing Sheets

MOBILE STORAGE CONTAINER FOR TRAVERSING WALLED PATHWAYS

REFERENCE TO RELATED APPLICATIONS

The present application is a continuation-in-part application of copending U.S. patent application Ser. No. 15/330,440, by the same inventor herein, namely, Wallace J. Crowley, Jr., filed on Sep. 22, 2016 titled "MULTITRACK STORAGE SYSTEM WITH CENTRAL TERMINUS".

BACKGROUND OF INVENTION a. Field of Invention

The present invention relates to movable storage containers for traversing walled pathways, that are especially useful in storage systems for personal, business or commercial use. These storage containers are wheeled storage containers with at least four bottom wheels and four bumper (side) wheels. In some preferred embodiments, the present invention containers have connection means wherein they may be removeably connected to one another to create a train of containers.

b. Description of Related Art

The following patents are representative of the field pertaining to the present invention:

U.S. Pat. No. 8,893,623 B2 to Gordon describes a multi-track multi-vehicle coaster that simulates a popular theme of a competition, struggle or conflict taken from history or fiction. The vehicles interact with each other and interact with the ride scenery in many different ways. The vehicle velocity is altered at different points in the ride using multiple motors and brakes. An interactive queue is provided and allows people in the queue to interact with people on the ride. Energy recycling and computer ride control are also disclosed.

U.S. Pat. No. 7,980,181 B2 to Heaslip et al. describes a drag racing roller coaster amusement ride that has at least two sets running rails, each set having at least one running rail and an embark point. At least two carriers (109) are arranged to carry at least one rider on a respective set of running rails with the rider(s) in a substantially prone position. Each carrier is arranged to slidingly engage with the respective set of running rails to enable the carriers to traverse the ride. The ride has an indicator (109) to provide a ride commencement indication. A launch system is configured to provide a powered initial motion to each carrier. Each carrier has a ride activator controllable by a rider of the carrier to trigger the launch system to commence the ride for the carrier following the ride commencement indication. Launch systems are also disclosed.

U.S. Pat. No. 4,372,451 to Rasmussen et al. describes a gravity-feed merchandise storage and delivery rack that includes upstanding support columns and a plurality of vertically-spaced storage shelves mounted upon the support columns by means of mounting clips; each storage shelf includes rearward and forward side frame members interconnected by splice members including offset portions so that the forward side frame member is offset outwardly with respect to the rearward side frame member to facilitate passage of merchandise thereby; an intermediate guide member on the storage shelf having a pin adjustably positioned thereon and extending downwardly therefrom to engage in openings in a channel member extending transversely of the storage shelf; and a shelf support infinitely adjustable upon an intermediate support column for supporting an elongated storage shelf intermediate the front and rear thereof.

U.S. Pat. No. 4,347,791 to Mandros describes a guideway system for cargo including vehicles is provided wherein a carriage glides on a rail mounted in a channel. The rail has compressed air discharge ports and vacuum intake ports positioned longitudinally therealong. The compressed air ports emit sufficient air to provide an air support cushion under the carriage and to impart positive air pressure behind it while the vacuum ports reduce the air pressure forward of the carriage to create an air pressure differential that propels the carriage along such rail. Vehicles drive onto a carriage, are secured in place and are conveyed to a desired station on such carriage. The vehicle then unloads from the carriage and drives off to its final destination. Similarly, other cargo is loaded onto a carriage and unloaded at its destination. In another embodiment, the carriage has a longitudinal slot in its underbody adjacent its support rail and compressed air is discharged from ports in the rail at the forward portion of the slot to propel the carriage along the rail.

U.S. Pat. No. 4,203,368 to Haskins describes an apparatus for moving loads from one position to another, employing an arrangement of a plurality of loop and/or spur tracks supported from above and having terminals converging in a direction of a pivot point having secured thereat a radial transfer track having a free swinging end adapted to couple with any of the loop and/or spur tracks to effect transfer of a hoisted load supported on one of the tracks, to another track via the radial transfer track. The radial transfer track is supported, adjacent its swinging end, on an arcuate support track which is concentric to an arcuate line passing through all of the converging terminals of the loop and/or spur tracks.

United States Patent Application Publication No. 2014/0015223 A1 to Banwart describes a powered converter trolley for movement and attachment of trailers that is provided. The trolley comprises a conventional converter trolley having a drawbar. The trolley has a power supply and operates as a towing device. The trolley connects to a freight trailer and can be raised or lowered from a stored position to a ground-engaging, working position. Alternatively, the wheels of the trolley may be powered for providing motion to the trolley. The trolley further comprises several attachment devices for securing the trolley to an intermodal railcar, including alternative hydraulic, mechanical, and electrically-powered tie down devices. A trolley movable along a railcar is provided for securing the trolley or trailer to the railcar and includes a hitch component for selectively interconnecting to a hitch component on the trolley or trailer.

United States Patent Application Publication No. 2005/0038575 A1 to Wu describes an autonomous personal transportation system for moving passengers and light freights which is constructed with a track network and small vehicles on the track network. There are a number of stations and stops for loading and unloading on side tracks off the mainline of the track network. The vehicle width is limited to a dimension for one seat. The vehicles can be coupled statically or dynamically to form a train. The track has side rails for the rigid wheels of the vehicle and a central rail for centering the vehicle on the guideway and providing additional acceleration and braking capability. The control system for the movement of vehicles is divided into three levels: the central control system, the wayside control system and the vehicle control system.

Notwithstanding the prior art, the present invention is neither taught nor rendered obvious thereby.

SUMMARY OF INVENTION

The present invention relates to a movable storage container for traversing walled pathways, including: a) a bin structure having a bottom and sidewalls and an open top, the bin structure having an imaginary midline that defines a center, wherein there is a forward section in front of the midline and an aft section behind the midline; b) at least four ground wheels connected to the bin structure adjacent to the bin structure bottom for movement along any surface below the bottom of the bin structure, at least two of the at least four ground wheels being in the forward section and at least two of the four ground wheels being in the aft section; c) at least four bumper wheels connected to the bin structure for movement along any surface aside the sidewalls, at least two of the at least four bumper wheels being in the forward section and at least two of the four bumper wheels being in the aft section.

In some embodiments of the present invention movable storage container, the container further includes a cover.

In some embodiments of the present invention movable storage container, the ground wheels are caster wheels that rotate on both a vertical axis and a horizontal axis.

In some embodiments of the present invention movable storage container, the bumper wheels are wheels having a non-horizontal axis of rotation within the range of minus 45 degrees to plus 45 degrees from horizontal. In more preferred embodiments of the present invention movable storage container, the bumper wheels are wheels having a non-horizontal axis of rotation within the range of minus 20 degrees to plus 20 degrees from horizontal.

In some embodiments of the present invention movable storage container, the ground wheels are wheels having a non-vertical axis of rotation within the range of minus 45 degrees to plus 45 degrees from horizontal. In more preferred embodiments of the present invention movable storage container, the ground wheels are wheels having a non-vertical axis of rotation within the range of minus 20 degrees to plus 20 degrees from horizontal.

In some embodiments of the present invention movable storage container, the container has four ground wheels and four bumper wheels.

In some embodiments of the present invention movable storage container, the container is rectangular in shape with four corners and the bumper wheels are located at each of the four corners.

In some embodiments of the present invention movable storage container, the bin structure has a male and a female connector located on opposite sides of the imaginary midline.

In more preferred embodiments, the present invention movable storage container for traversing walled pathways, includes: a) a bin structure having a bottom and sidewalls and an open top, the bin structure having an imaginary midline that defines a center, wherein there is a forward section in front of the midline and an aft section behind the midline; b) at least four ground wheels connected to the bin structure adjacent to the bin structure bottom for movement along any surface below the bottom of the bin structure, at least two of the at least four ground wheels being in the forward section and at least two of the four ground wheels being in the aft section; c) at least four bumper wheels connected to the bin structure for movement along any surface aside the sidewalls, at least two of the at least four bumper wheels being in the forward section and at least two of the four bumper wheels being in the aft section, wherein there is an imaginary peripheral straight line connecting two of the bumper wheels, with two of the bumper wheels being positioned so that the imaginary peripheral straight line crosses the imaginary midline and is outside the top view footprint of the bin structure.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
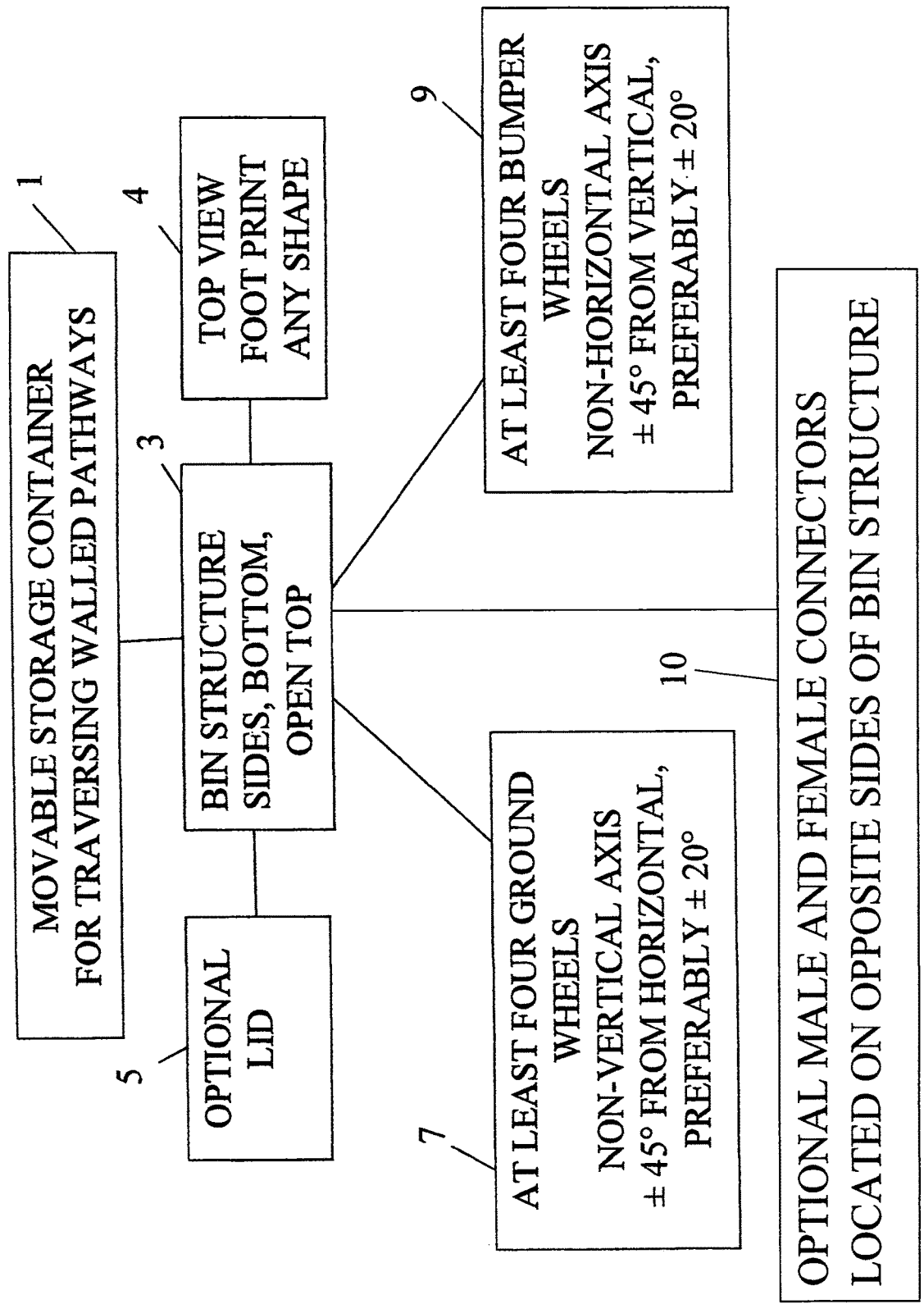
FIG. 1 is a block diagram showing some of the features and options of a present invention moveable storage container for traversing walled pathways.

Referring now in detail to the drawings wherein like reference numerals designate corresponding parts throughout the several views, various embodiments of the present invention are shown.

FIG. 1 is a block diagram showing some of the features and options of the present invention moveable storage container for traversing walled pathways. Block 1 shows a present invention storage container for traveling along pathways with walls. It includes a bin structure, Block 3, with sides, a bottom and open top. From a top view foot print, Block 4, the bin structure may have any shape, such as round, oval, rectangular, square, polygonal or asymmetric. The bin structure may have an optional lid, Block 5, which may be attached or detached. If attached, any connection mechanism may be used, such as hinges, slides, tethers, or otherwise. Critical features of the present invention include at least four ground wheels, Block 7, and at least four bumper wheels, Block 9. The ground wheels rotate on a non-vertical axis within a broad range, and the bumper wheels rotate on a non-horizontal axis within a broad range. By "ground wheels" is meant wheels that rest on the ground, such as a ground or chute or concrete pad, with walls. By "bumper wheels" is meant wheels that ride along or deflect walls. There are at least four ground wheels that typically run on a horizontal axis, thus, non-vertical, and may deviate from horizontal broadly by ±45° and preferably by ±20°. There are at least four bumper wheels that typically run on a vertical axis, thus, non-horizontal, and may deviate from vertical broadly by ±45° and preferably by ±20°. Block 10 shows optional male and female connectors on opposite sides of the bin structure. As stated above, the present invention containers may have connection means wherein they may be removeably connected to one another to create a train of containers.

Figure 2:
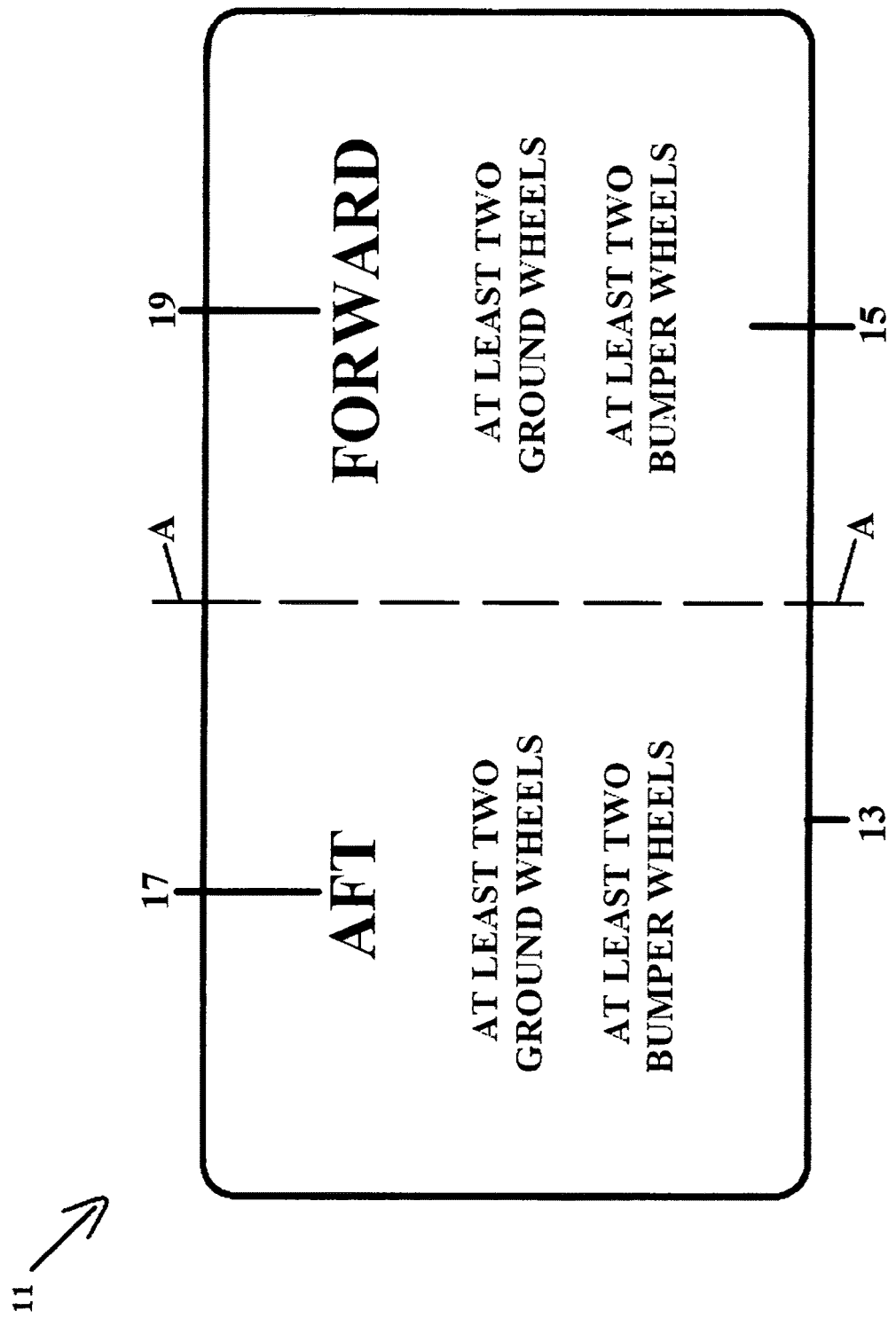
FIG. 2 is a top view schematic diagram of a present invention moveable storage container for traversing walled pathways showing the relationships among the various wheels and the bin.

FIG. 2 is a schematic diagram of a plural wheeled bin 11 of the present invention moveable storage container for traversing walled pathways. It has an imaginary midline A-A which defines its center. There is an aft section 17 of the bin 11 behind midline A-A and a forward section 19 of the bin 11 in front of midline A-A. The bin 11 has a bottom 15 and side walls 13. The aft section 17 of the bin 11 has at least two ground wheels and at least two bumper wheels. The forward section of the bin 11 has at least two ground wheels and at least two bumper wheels. The wheels may be of different sizes, materials and weight ratings. The placement and quantity of the wheels on the container may vary depending on the dimensions, shape and weight requirements of application specifications.

Figure 3:
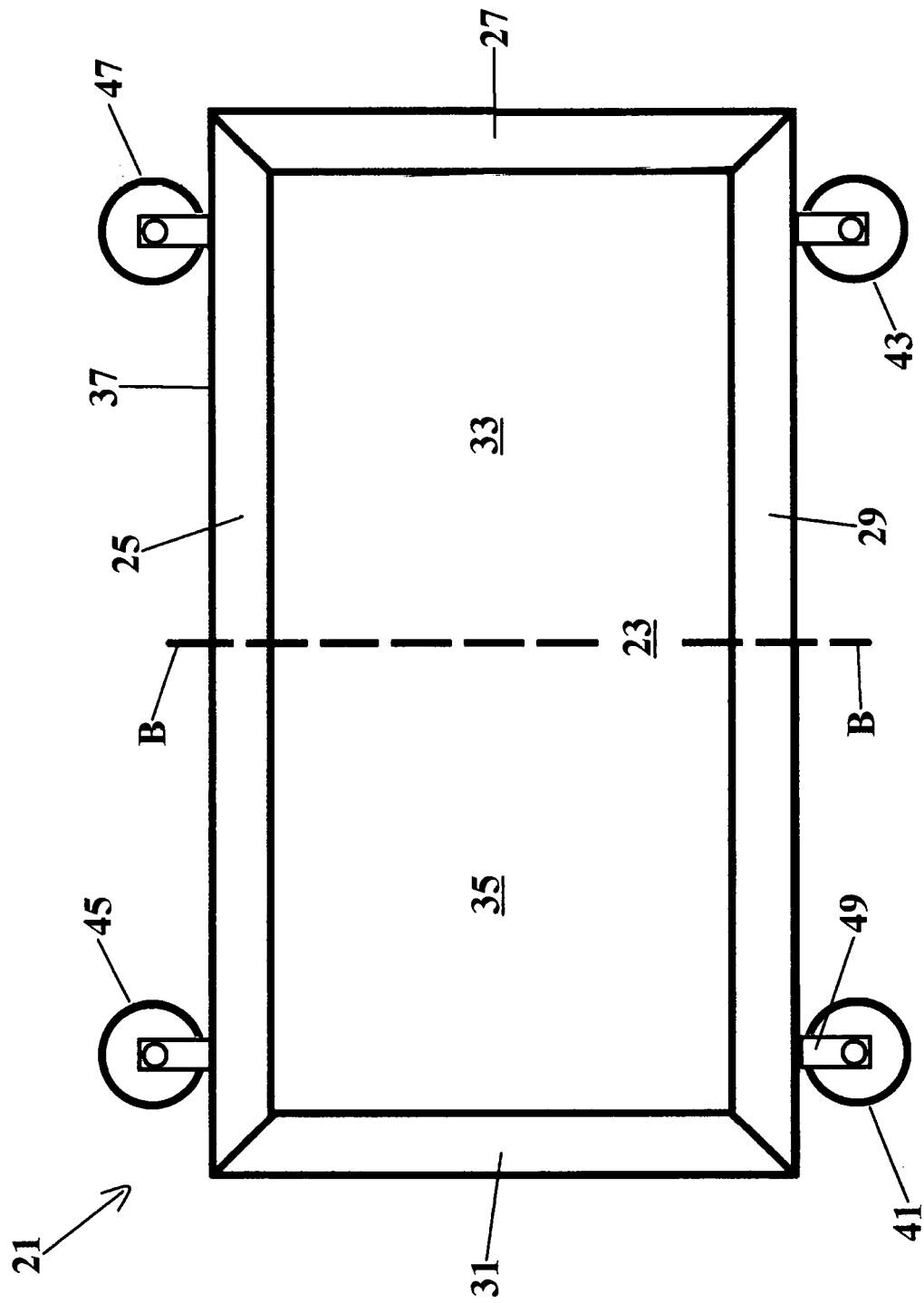
FIG. 3 illustrates a top view of a present invention moveable storage container for traversing walled pathways that includes fully extended bumper wheels.

FIG. 3 is an example of the top view of a plural wheeled bin 21 of the present invention moveable storage container for traversing walled pathways. It has an imaginary midline B-B that defines its center 23. There is an aft section 35 and a forward section 33. Bin 21 has a bottom 23 and it has side walls 25, 27, 29, and 31 and top 37. This bin 21 has two bumper wheels 41 and 45 in the aft section 35 along with two bumper wheels 43 and 47 in the forward section 33 of the bin 21. There are mounting brackets 49 on all four bumper wheels of said bin. There are also four ground wheels on said bin (not shown).

Figure 4:
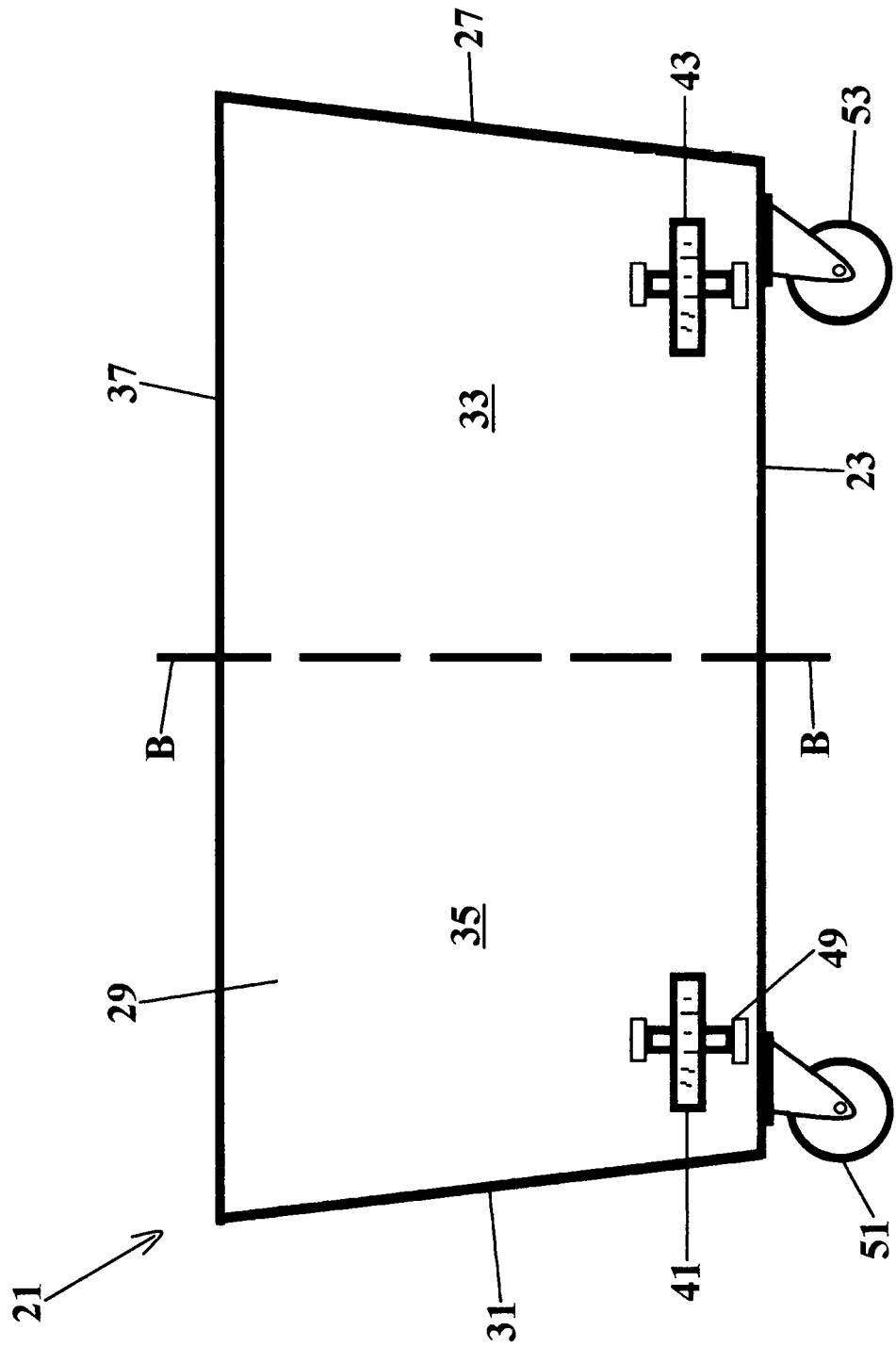
FIG. 4 shows a side view of the present invention moveable storage container for traversing walled pathways shown in FIG. 3.

FIG. 4 is a side view of the present invention moveable storage container shown and described in FIG. 3 above. Reference numbers in this figure that show identical components that are in FIG. 3 are identically numbered. In this figure, two of the four ground wheels are shown, specifically, wheels 51 and 53, and the two bumper wheels 41 and 43 are also shown. As can now be seen, the bumper wheels are positioned on the side walls above bottom 23. These bumper wheels could be located higher than shown, lower or be attached to bottom 23 or even lower, such as being attached to the brackets that support the ground wheels.

Figure 5:
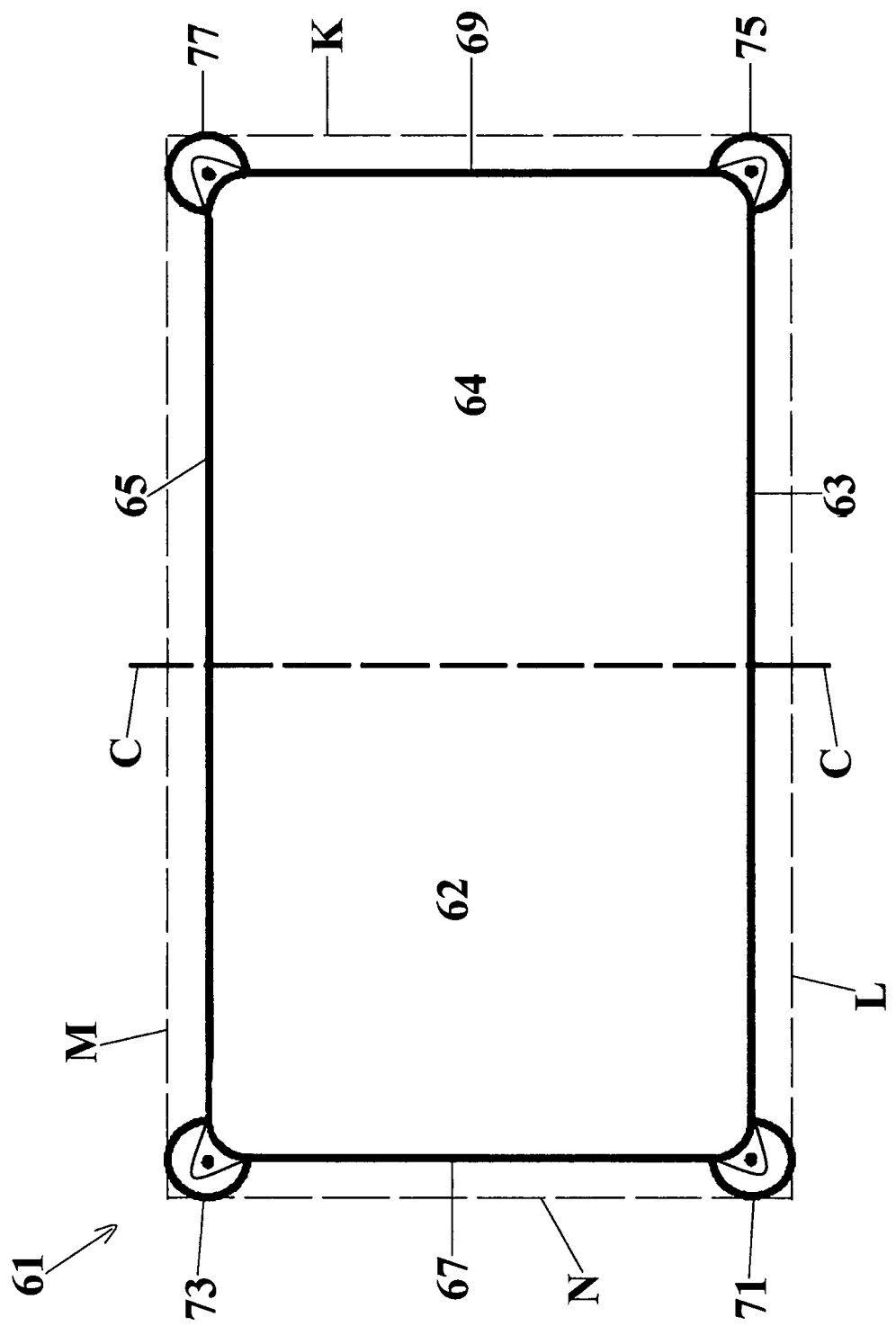
FIG. 5 shows a top view of an alternative embodiment of a present invention moveable storage container for traversing walled pathways with the bumper wheels positioned on the corners of the bins.

FIG. 5 is an example of the top view of a plural wheeled bin 61 of the present invention moveable storage container for traversing walled pathways. The bin 61 is rectangular in shape. It has an imaginary midline C-C that defines its center. There is an aft section 62 and a forward section 64. It may be noted that "front" and "back" walls and "forward" and "aft" sections are relative. For purposes of illustration, in all figures, assume travel from left to right. There are sides 63 and 65 of the bin 61 along with the front end 69 and the back end 67. There are two aft bumper wheels 71 and 73, and two forward bumper wheels 75 and 77. There are four caster type ground wheels on the bottom of the bin (not shown). The clearance lines are K, L, M and N. These establish the apparent footprint for travel of bin 61 and this shows clearances needed for travel forward, backward or sideways down a pathway, hall, slide or track.

Figure 6:
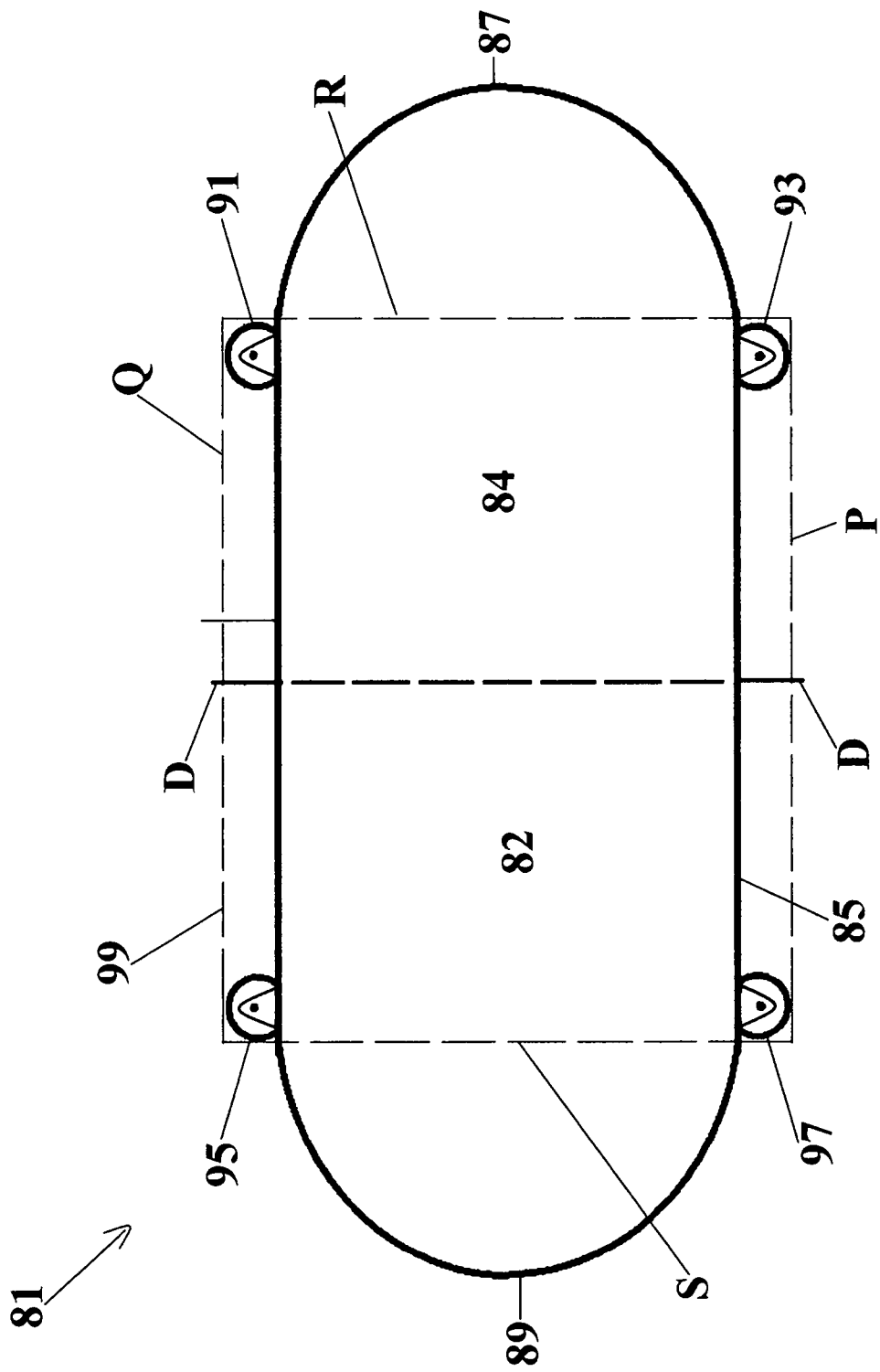
FIG. 6 shows a top view of another present invention moveable storage container for traversing walled pathways that is shaped like a capsule with flat side walls and semi-circular front and back walls.

FIG. 6 is an example of the top view of a plural wheeled bin 81 of the present invention moveable storage container for traversing walled pathways. The bin 81 is generally elliptical in shape, like a medicine capsule, having flat sides and semi-circular ends. It has an imaginary midline D-D that defines its center. There is an aft section 82 and a forward section 84. There are the sides 83 and 85 of the bin along with the ends of the bin 87 and 89. The two aft bumper wheels 95 and 97 and the two forward bumper wheels 91 and 93 are located as shown. There are four to six caster type ground wheels on the bottom of the bin 81 (not shown). Imaginary rectangle 99 shows clearance lines and non-clearance lines. The clearance lines are P and Q and the non-clearance lines are R and S.

Figure 7:
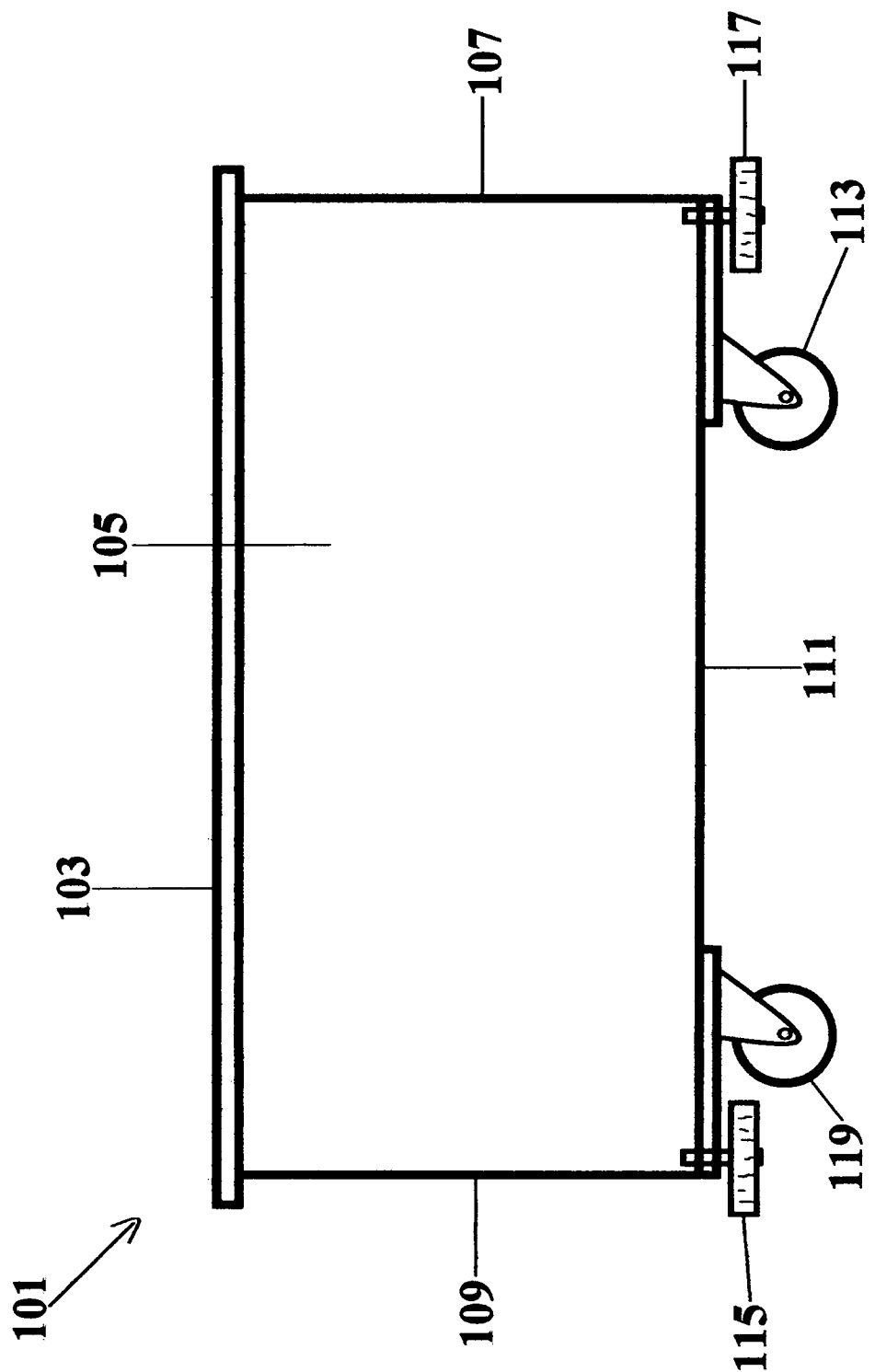
FIG. 7 shows a side view of a present invention moveable storage container for traversing walled pathways with the bumper wheels below the bin at the corners.

FIG. 7 is a side view of a plural wheeled bin 101 of the present invention moveable storage container for traversing walled pathways. The bin 101 is rectangular in shape. There are the sides 105 of the bin 101 and the other (not shown) along with the ends 107 and 109 of the bin 101. There is a bottom 111. There are four bumper wheels. Two bumper wheels 115 and 117 are shown. The other two bumper wheels are not shown. Two caster ground wheels 113 and 119, of four, are shown. They are located on bottom 111. Additionally, two bumper wheels 115 and 117, of four, are shown with axles projecting downwardly from bottom 111. Unlike prior figures, these bumper wheels are not attached to side wheels, and, additionally, are located on corners so that they act as both side and front/read bumper wheels. In this embodiment, container 101 has a removable snap lid 103.

Figure 8:
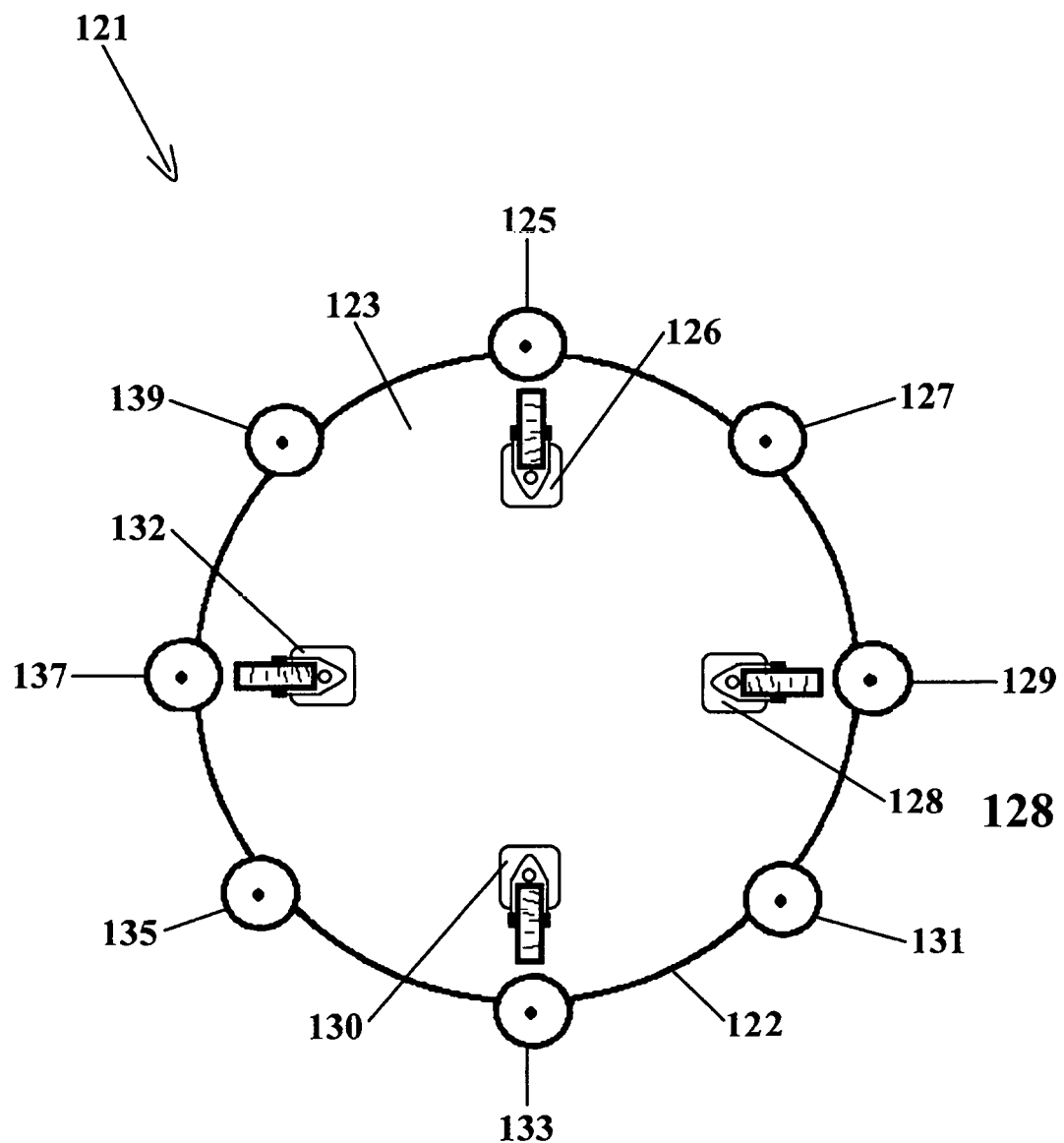
FIG. 8 shows a bottom view of an alternative embodiment present invention moveable storage container for traversing walled pathways that is circular in shape and has eight bumper wheels.

FIG. 8 is a bottom view of a present invention moveable storage container with a wheeled bin 121 for traversing walled pathways. The bin 121 is circular in shape. There is a continuous circular edge 122 of the bin 121. There eight bumper wheels around the outside of the bottom 125, 127, 129, 131, 133, 135, 137 and 139. There are also four caster type ground wheels on the bottom of the bin 126, 128, 130 and 132.

Figure 9:
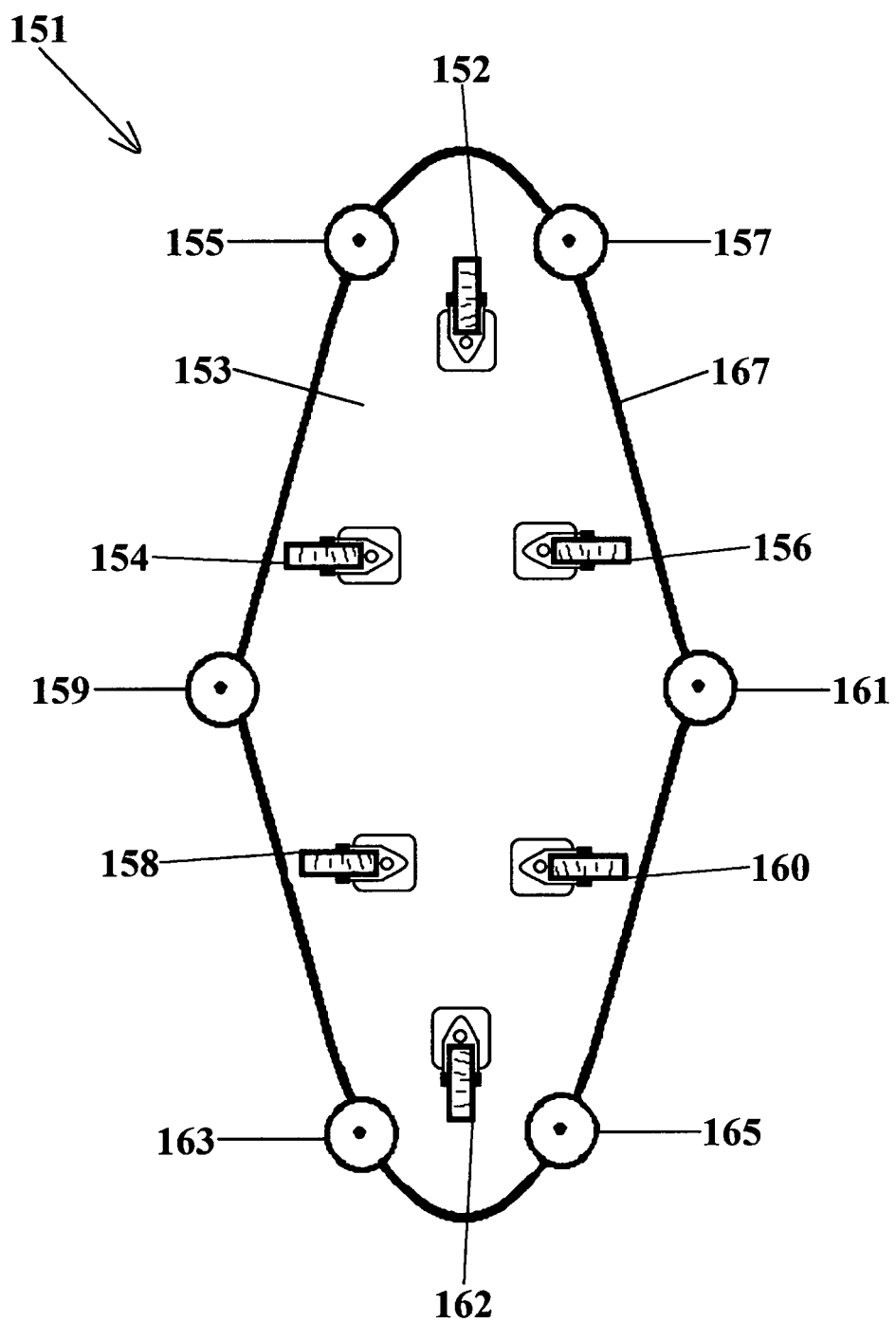
FIG. 9 shows a bottom view of a present invention moveable storage container for traversing walled pathways that has the shape of a fat skateboard with six ground wheels (with casters) and six bumper wheels.

FIG. 9 is a bottom view of a present invention moveable storage container 151 for traversing walled pathways with wheeled bin 121. The bin 121 is rounded diamond in shape that has a similar shape to a wide-centered skateboard. Along edge 167 of bin 121 are six bumper wheels 155, 157, 159, 161, 163 and 165 around the outside of the bottom 153. There are also six caster type ground wheels 152, 154, 156, 158, 160 and 162 on the bottom 153 of bin 121.

Figure 10:
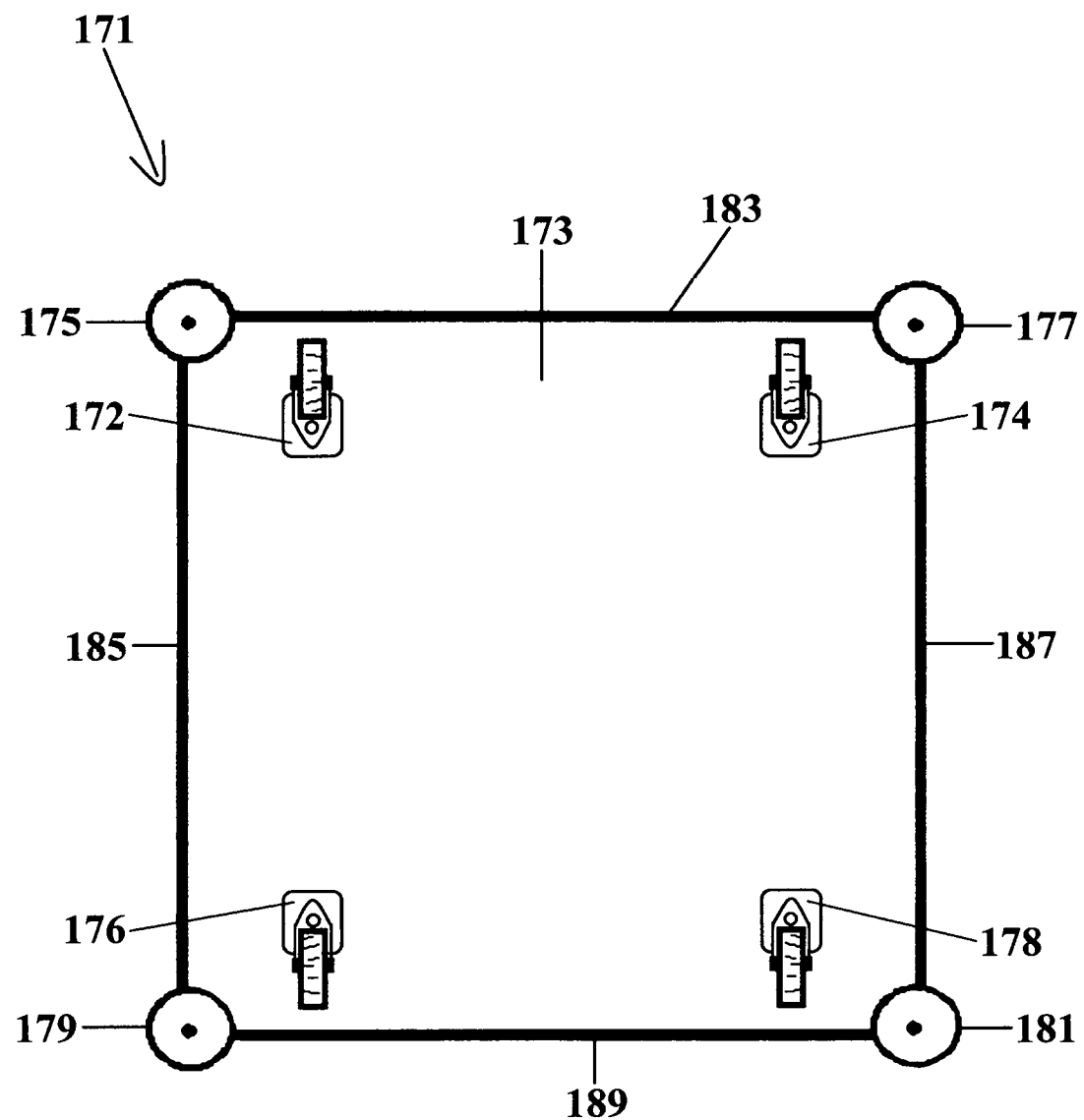
FIG. 10 illustrates a bottom view of a square present invention moveable storage container for traversing walled pathways having corner bumper wheels and caster type ground wheels.

FIG. 10 is a bottom view of a present invention moveable storage container for traversing walled pathways with wheeled bin 171. The bin 171 is square in shape and has four equal sides 183, 185, 187 and 189. There four bumper wheels 175, 177, 179 and 181 at each corner of the bottom 173. There are also four caster type ground wheels 172, 174, 176 and 178 on the bottom 173 of bin 171.

Figure 11:
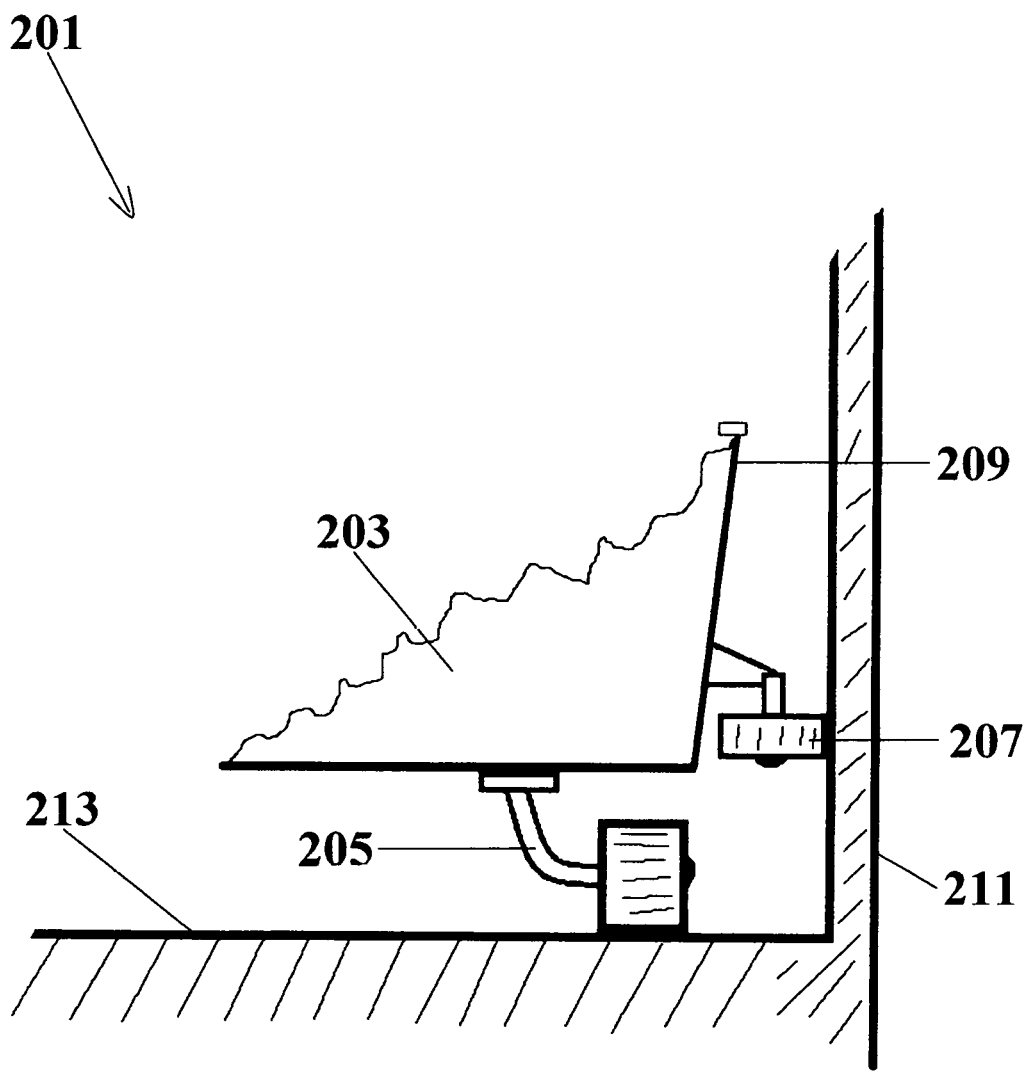
FIG. 11 shows a partial rear-cut view of a present invention moveable storage container for traversing walled pathways showing the pathway and pathway walls and the relationships of the ground wheels and the bumper wheels.

FIG. 11 is partial cut end view of a present invention moveable storage container 201 for traversing walled pathways. It shows a portion of bin 203, one of at least four ground wheels, namely, ground wheel 205, and one of at least four bumper wheels, namely, bumper wheel 207. There is a cut-a-way section of a pathway base 213 and pathway side wall 211. The bin 203 is showing a caster type ground wheel 205 and a side mounted bumper wheel 207, which is mounted to side 209. As can be seen, the container 201 may be pushed along pathway base 213 and bumper wheels, such as bumper wheel 207, which will prevent bin 203 from damaging wall 211 or vice versa.

Figure 12:
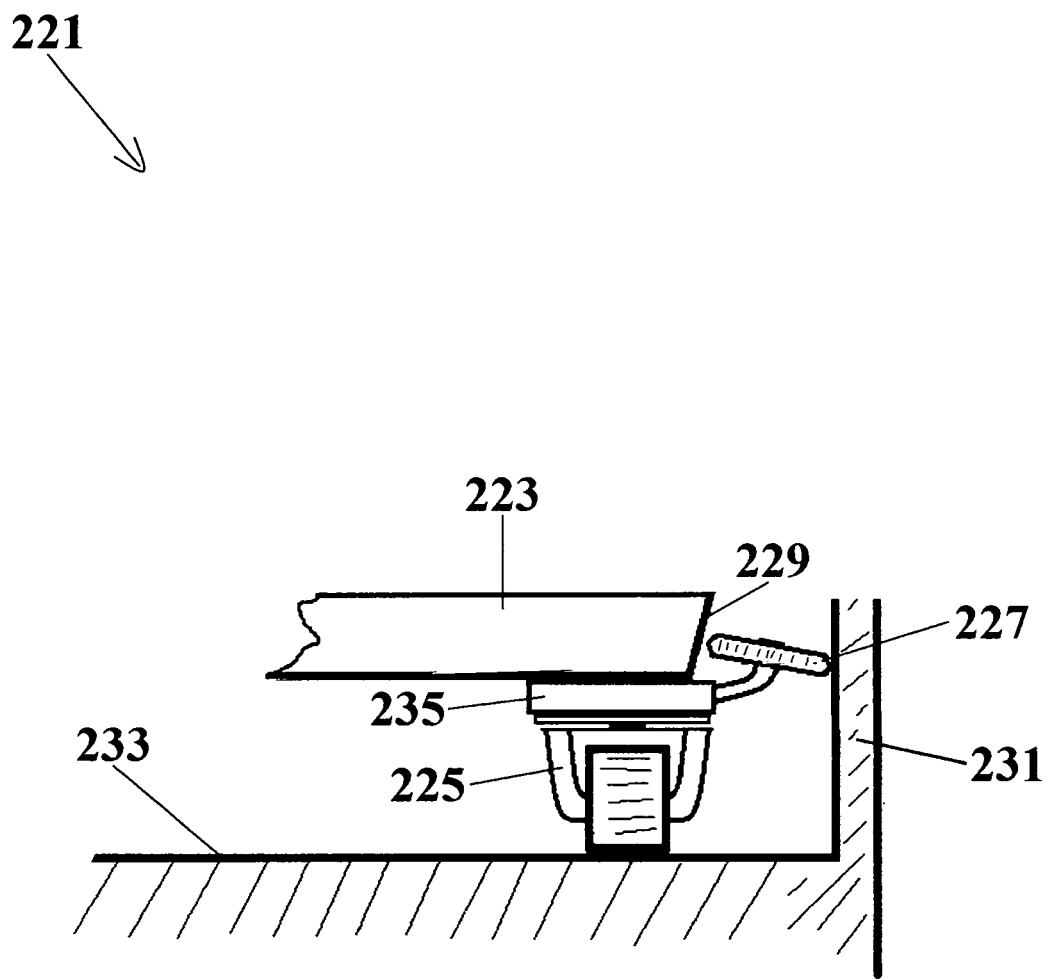
FIG. 12 shows another alternative embodiment of a present invention moveable storage container for traversing walled pathways wherein the bumper wheel is at an angle of about 10° from vertical.

FIG. 12 is an example of the end/corner view of a plural wheeled tray or bin of the present invention moveable storage container 221 for traversing walled pathways. The cut-a-way section of a base is 233 and side wall 231. The tray or bin 223 is showing a caster type ground wheel 225 and a side mounted bumper wheel 227, which are mounted to the wheel base 235. The side mounted bumper wheels are wheels having a non-horizontal axis of rotation, and is adjacent sidewall 229.

Figure 13:
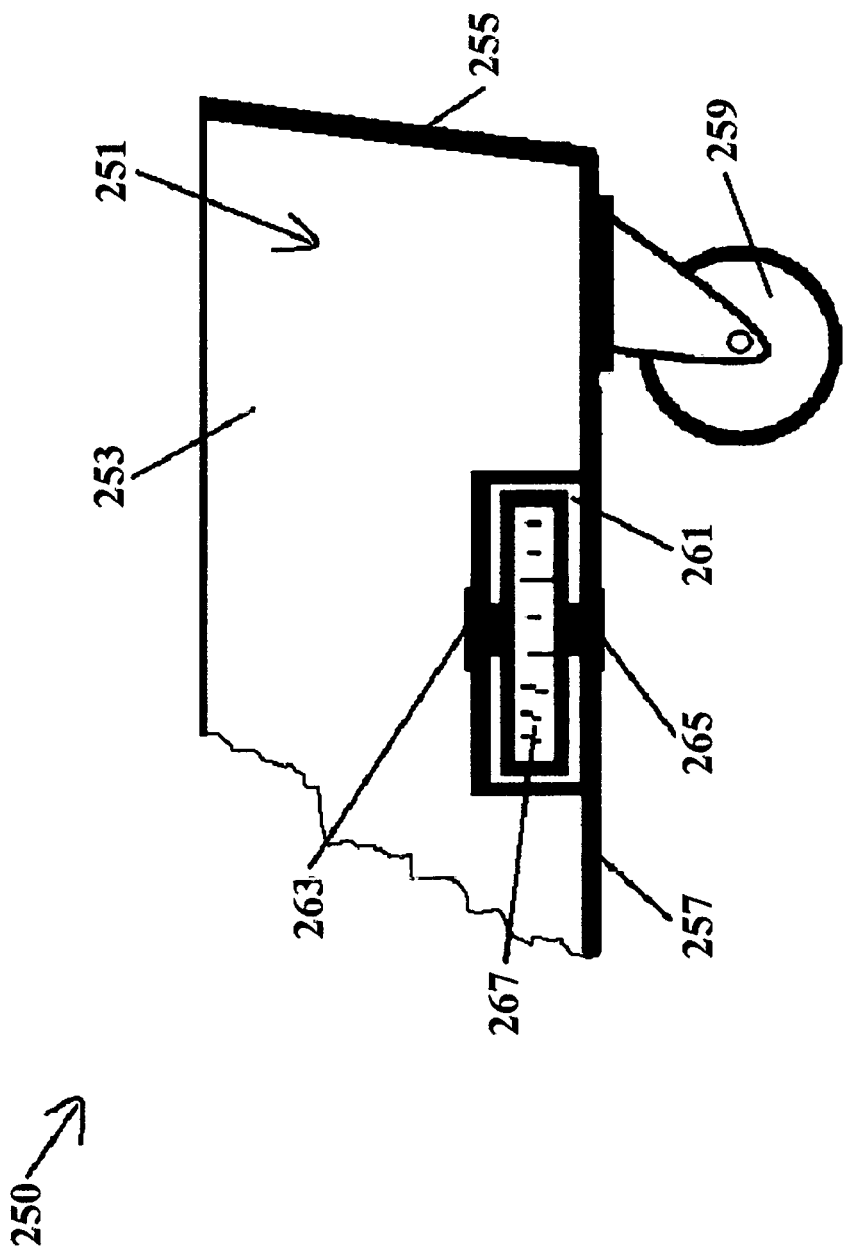
FIGS. 13, 14, 15 and 16 show side cut views of four different versions of a present invention moveable storage container wherein the bin is molded to include an internal recess and mount holes or external recess and mount holes for mounting bumper wheels and ground wheels, such as by snap-fit insertions.
Figure 14:
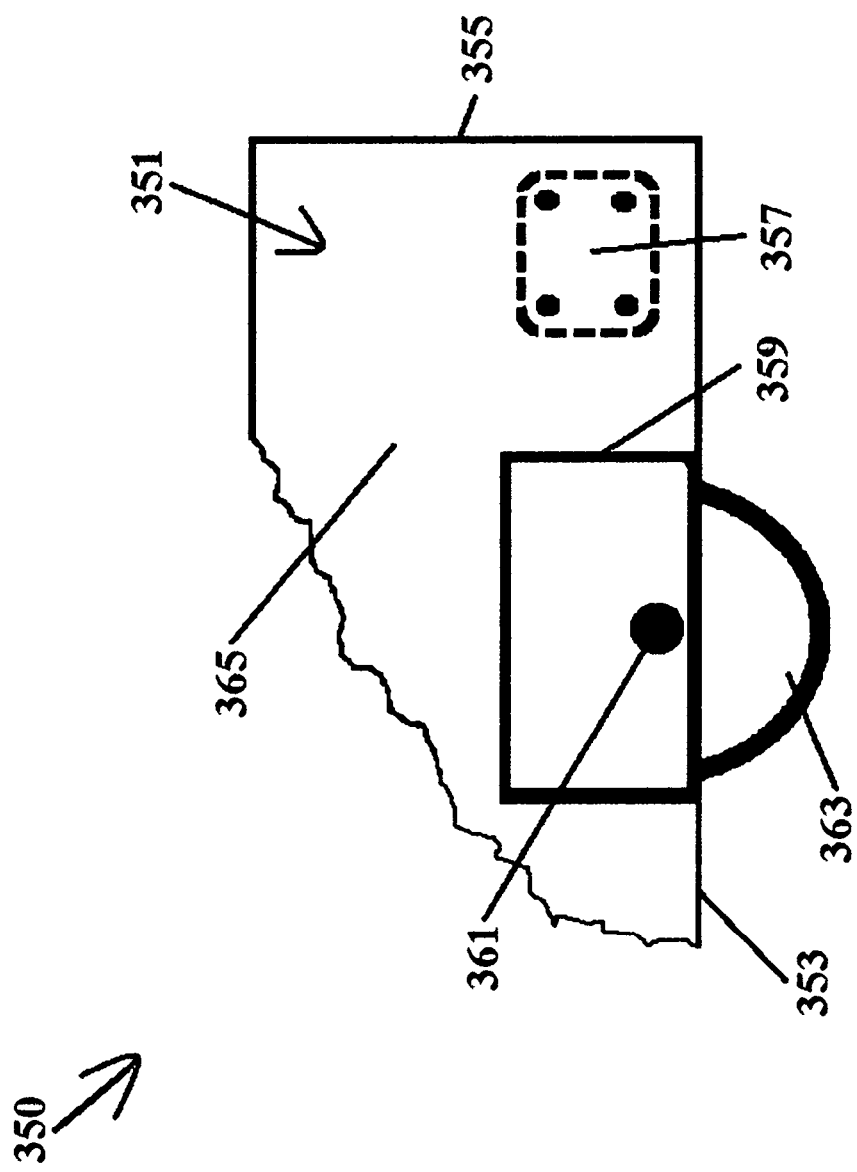

FIGS. 13, 14, 15 and 16 show side cut views of four different versions of a present invention moveable storage container wherein the bin is molded to include an internal recess and mount holes or external recess and mount holes for mounting bumper wheels and ground wheels, such as by snap-fit insertions. FIGS. 13 and 14 relate to molded bins that accommodate snap-in or force-fit bumper wheel assemblies.

In FIG. 13, there is a present invention movable storage container 250 that includes bin 251 with side wall 253, front wall 255 and bottom 257, as well as other aspects that are not shown. Bottom 257 has a caster wheel 259 that is attached by conventional means, such as bolts, rivets, screws, heat welding, etc. Side wall 253 has a molded indented bumper wheel receiver slot 261 that is made during the plastic molding, machining or other construction process and has receiving wells 263 and 265, such that when bumper wheel 267 is pushed into receiver slot 261, the bumper wheel axle ends fit into wells 263 and 265 to allow rotation but not allow removal of bumper wheel 267.

In FIG. 14, there is a present invention movable storage container 350 that includes bin 351 with bottom 353, front wall 355 and side wall 365, as well as other aspects that are not shown. This is a view looking at the inside of side wall 365. On the outside of side wall 365 is a conventionally attached bumper wheel assembly 357. Side wall 365 has a molded ground wheel receiver slot 359 that is located inside and is made during the plastic molding, machining or other construction process. It has receiving wells such as well 361, such that when ground wheel 363 is pushed up into receiver slot 359, the ground wheel axle ends fit into the wells to allow rotation but not allow removal of ground wheel 363.

Figure 15:
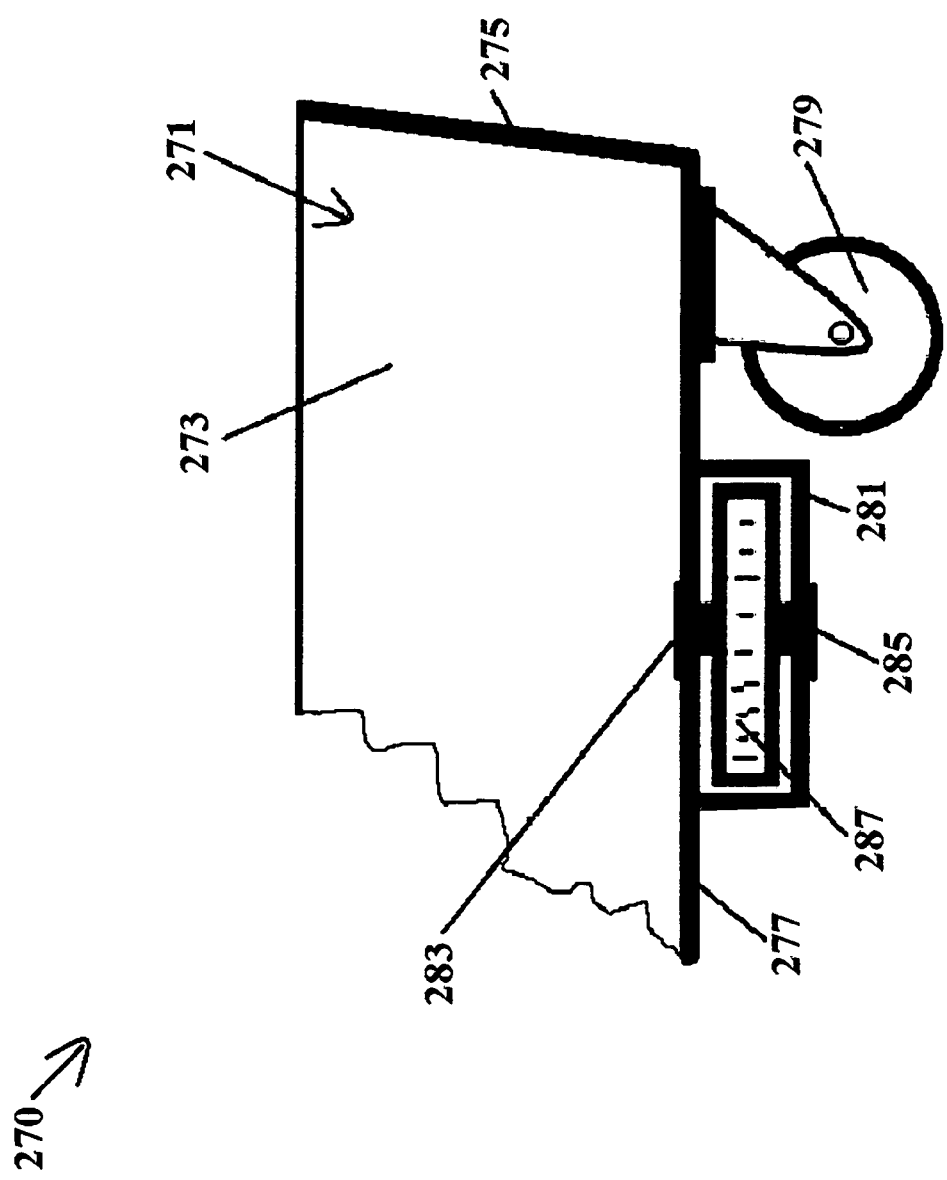

In FIG. 15, there is a present invention movable storage container 270 that includes bin 271 with side wall 273, front wall 275 and bottom 277, as well as other aspects that are not shown. Bottom 277 has a caster wheel 279 that is attached by conventional means, as shown. Bottom 277 has a molded bumper wheel receiver slot 281 that is located below the bottom 277 and is made during the plastic molding, machining or other construction process. It has receiving wells 283 and 285, such that when bumper wheel 287 is pushed into receiver slot 281, the bumper wheel axle ends fit into wells 283 and 285 to allow rotation but not allow removal of bumper wheel 287.

Figure 16:
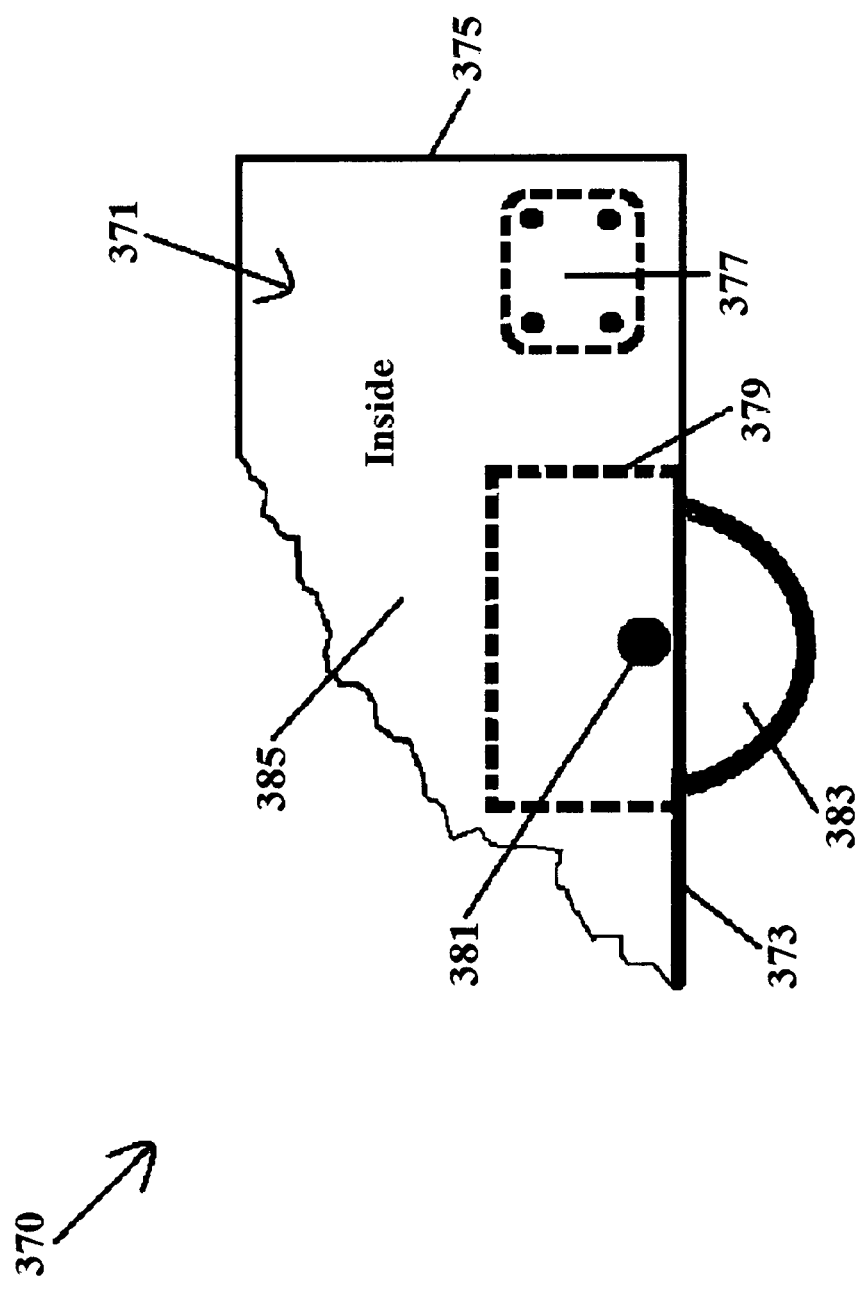

In FIG. 16, there is a present invention movable storage container 370 that includes bin 371 with bottom 373, front wall 375 and side wall 385, as well as other aspects that are not shown. This is a view looking at the inside of side wall 385. On the outside of side wall 385 is a conventionally attached bumper wheel assembly 377. Side wall 385 has a molded ground wheel receiver slot 379 that is located outside and is made during the plastic molding, machining or other construction process. It has receiving wells such as well 381, such that when ground wheel 383 is pushed up into receiver slot 379, the ground wheel axle ends fit into the wells to allow rotation but not allow removal of ground wheel 383.

Figure 17:
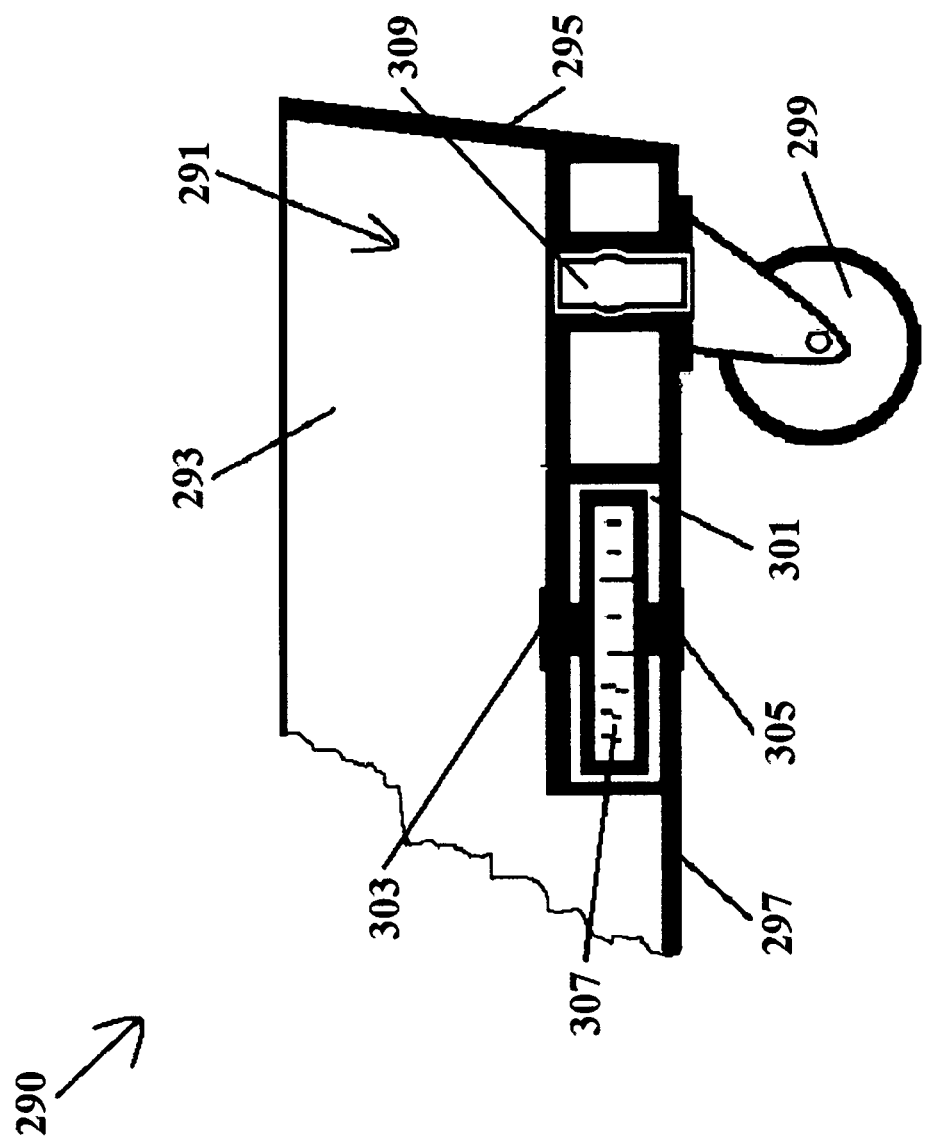
FIGS. 17 and 18 show portions of present invention moveable storage containers wherein the bin is molded to include an internal recess and mount holes or external recess and mount holes for mounting bumper wheels and ground wheels, such as by snap-fit insertions.

In FIG. 17, there is a present invention movable storage container 290 that includes bin 291 with side wall 293, front wall 295 and bottom 297, as well as other aspects that are not shown. Bottom 297 has a ground caster wheel 299 that is attached, as shown. Bottom 297 has a molded bumper wheel receiver slot 301 that is located below the bottom 297 and is made during the plastic molding, machining or other construction process. It has receiving wells 303 and 305, such that when bumper wheel 307 is pushed into receiver slot 301, the bumper wheel axle ends fit into wells 303 and 305 to allow rotation but not allow removal of bumper wheel 307. As can be seen in this Figure, a molded well is adapted to receive caster rod 309 for ground caster wheel 299.

Figure 18:
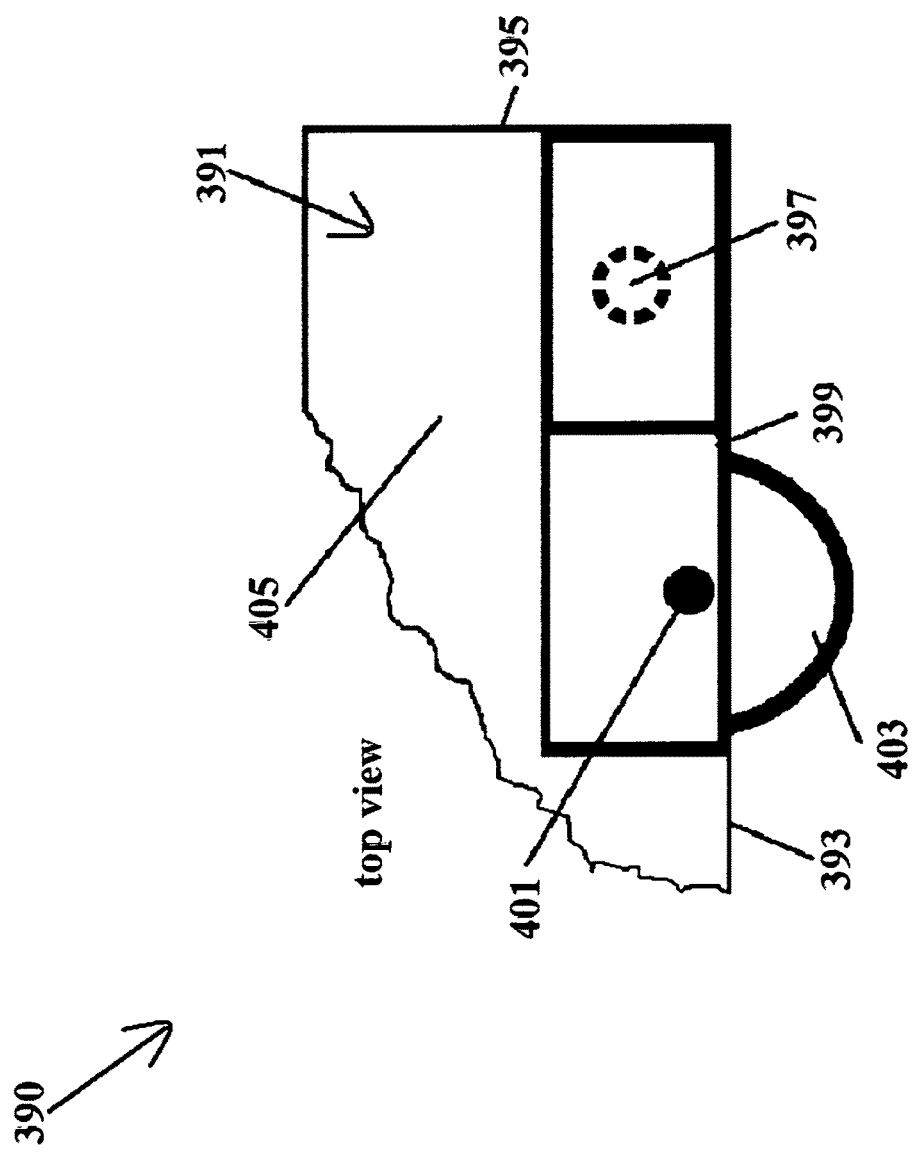

In FIG. 18, there is a present invention movable storage container 390 that includes bin 391 with side wall 393, front wall 395 and bottom 405, as well as other aspects that are not shown. Side wall 393 has a molded wheel receiver slot 399 that is located inside and is made during the plastic molding, machining or other construction process. It has receiving wells such as well 401, such that when bumper wheel 403 is pushed into receiver slot 399, the wheel axle ends fit into the wells to allow rotation but not allow removal of bumper wheel 403. Likewise, there is a ground wheel caster receiver slot 397 for attaching a caster rod portion of a ground wheel (not shown).

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A movable storage container for traversing walled pathways, which compromises:
   a) a bin structure having a solid bottom and sidewalls and an open top, said bin structure having an imaginary midline that defines a center, wherein there is a forward section in front of said midline and an aft section behind said midline;

b) at least four ground wheels connected to said bin structure adjacent said bin structure bottom for movement along a surface below said bottom of said bin structure, at least two of said at least four ground wheels being in said forward section and at least two of said four ground wheels being in said aft section, wherein said ground wheels are wheels having a non-vertical axis of rotation within the range of minus 45 degrees to plus 45 degrees from horizontal;

c) at least four bumper wheels connected to said bin structure for movement along any surface aside said sidewalls and extending outwardly beyond said sidewalls, at least two of said at least four bumper wheels being in said forward section and at least two of said four bumper wheels being in said aft section, wherein said bumper wheels are wheels that are angled so that an imaginary line extending perpendicular from the surface below said bottom through the center of each bumper wheel respectively forms an angle of greater than 0 degrees and less than 45 degrees, on either side of the imaginary line, with a line coaxial with a rotational axis of each bumper wheel respectively.

2. The movable storage container of claim 1 wherein said container further includes a cover, and said sidewalls and said cover are solid.

3. The movable storage container of claim 1 wherein said at least four bumper wheels are located above said bin bottom.

4. The movable storage container of claim 1 wherein said ground wheels are caster wheels that rotate on both a vertical axis and a horizontal axis.

5. The movable storage container of claim 1 wherein said ground wheels are wheels having a non-vertical axis of rotation within the range of minus 20 degrees to plus 20 degrees from horizontal.

6. The movable storage container of claim 1 wherein said container has four ground wheels and four bumper wheels.

7. The movable storage container of claim 1 wherein said container is rectangular in shape with four corners and said bumper wheels are located at each of said four corners.

8. The movable storage container of claim 1 wherein said bin structure has a male and a female connector located on opposite sides of said imaginary midline.

9. The movable storage container of claim 1 wherein said container at least four bumper wheels are located above said bin bottom and wherein said ground wheels are caster wheels that rotate on both a vertical axis and a horizontal axis.

* * * * *